Jan. 7, 1941. E. O. BURRELL 2,227,821
STEERING COLUMN SHOCK ABSORBER
Filed Oct. 6, 1939
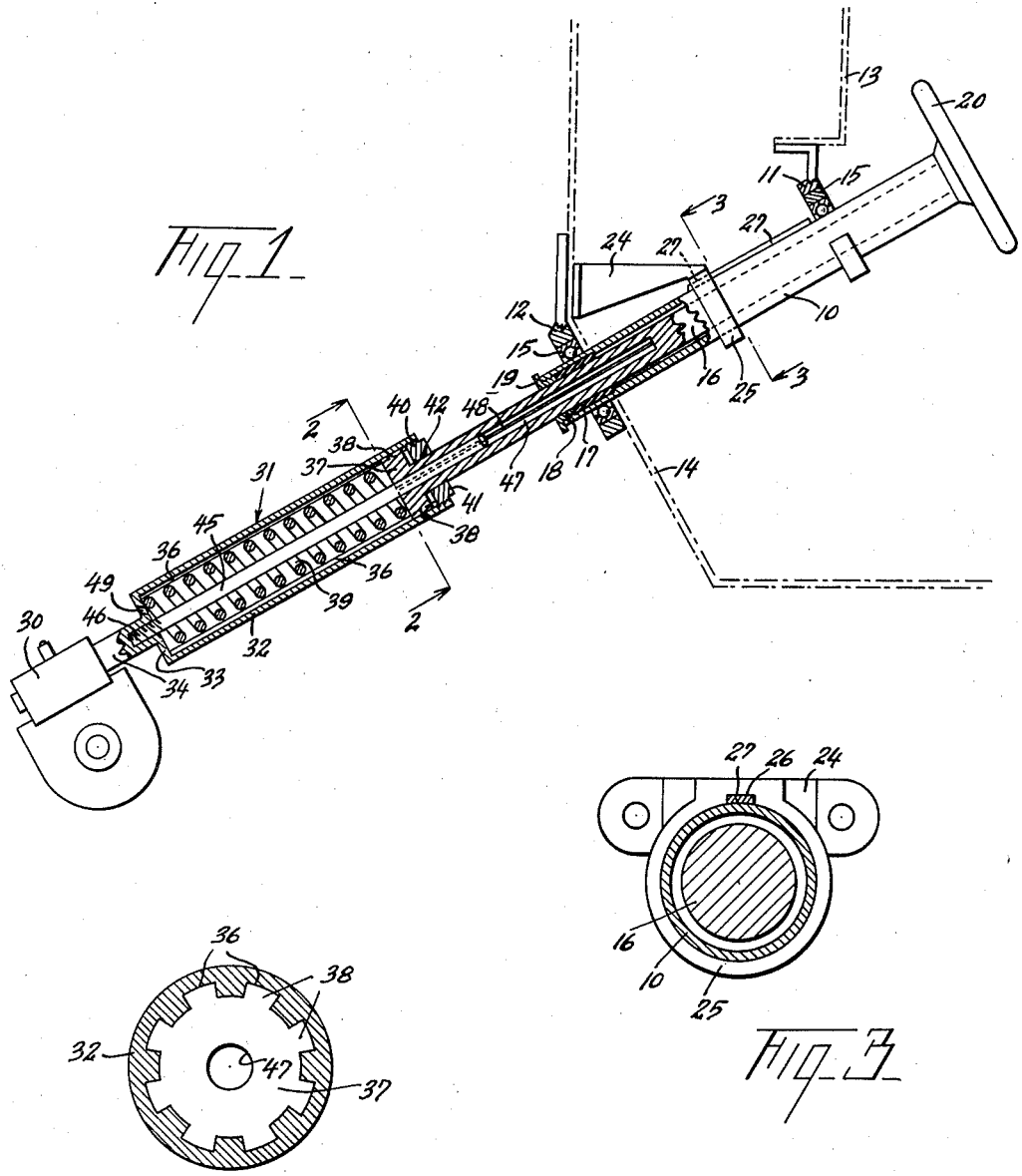
Inventor
*Emory Owen Burrell*
By *Carl Miller*
Attorney Patented Jan. 7, 1941

2,227,821

UNITED STATES PATENT OFFICE 2,227,821

STEERING COLUMN SHOCK ABSORBER

Emory Owen Burrell, Hanford, Calif.

Application October 6, 1939, Serial No. 298,272

2 Claims. (Cl. 74—493)

This invention relates to a steering column mechanism and more particularly to an improvement in a shock absorbing device therefor.

It is an object of the present invention to provide an improved shock absorbing device to be built into a steering column so as to permit a cushioned telescoping action thereof in the event of a force being applied against the steering wheel or upper end of steering column to thereby relieve the driver of car of the possibility of receiving a great shock which may result in a crushed chest in the event of a sudden stop such as arising from a collision, the shock absorbing device being also operative to relieve the driver of any shock arising from a sudden decrease in the speed of the car as in the emergency application of the brakes.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is an elevational view partly in section showing steering column shock absorber;

Figure 2 is a detail sectional view on line 2—2, Figure 1, showing spline construction; and Figure 3 is a detail sectional view on line 3—3, Figure 1, showing key construction on column housing.

Referring to the drawing, 10 denotes a steering column housing supported in proper position by the brackets 11 and 12 which are respectively secured to the dash 13 and partition 14 in any desired manner. Positioned within each bracket 11 and 12 is an anti-friction bearing 15 of such a form that the balls thereof will engage the outer cylindrical surface of the steering column housing 10 to provide freedom of bodily movement thereof axially of said bearings for a purpose to be hereinafter described.

Within the steering column housing 10 is a steering shaft 16 having rotative bearing engagement with a bushing 17 fitted in the lower part of the steering column housing 10 and retained in place by a threaded collar 18 positioned interiorly of said steering column housing, said collar 18 being formed to provide an annular abutment flange 19, and said shaft 16 projecting outwardly of said steering column housing for a substantial distance. The upper end of the steering shaft 16 is mounted in a similar bushing (not shown) and has affixed thereto a steering wheel 20. In order to prevent rotation of the steering column housing 10 and to limit the same only to axial movement, there is provided a bracket 24 having a collar 25 surrounding the steering column housing 10, said bracket being positioned intermediate the brackets 11 and 12 and suitably attached as to the partition 14 in any desired manner. Within the collar 25 is formed a guide groove 26 adapted to slidably receive therein a key or guide bar 27 fixedly secured to the exterior surface of the steering column housing 10 in such relation thereto and being of such a length as to be always in co-acting engagement with the guide groove 26 irrespective of the position of the steering column housing 10. Thus, the steering column housing 10 while restrained from any turning movement by the co-action of the guide bar 27 and guide groove 26 is nevertheless guided thereby for axial movement within the anti-friction bearing supports 15.

Interconnecting the steering shaft 16 with the worm (not shown) in the steering gear case 30 is the shock absorbing device indicated generally by the reference character 31.

The shock absorbing device comprises a cylinder 32 closed at its lower end by an integral wall 33 and provided with an integral axial shaft extension 34 for connection with the worm of the steering mechanism in the steering gear case in the manner well known. The inside surface of the cylinder 32 is provided with spline grooves 36 extending the full length thereof for mating engagement with a splined head 37 provided on the lower end of the steering shaft 16. The number of splines 38 on the head correspond with the number of spline grooves 36, the head 37 being of substantial thickness to insure the splines 38 being of a sufficient length to provide an area of contact with the spline grooves for the safe transmission of the torque in the steering shaft 16.

Placed within the cylinder 32 is a compression coil spring 39 seated at its lower end on the wall 33 and at its upper end engaging the steering shaft head 37. The open end of the cylinder 32 is closed by a threaded annular collar 40 fitted interiorly of the cylinder and locked therein in any suitable manner, not shown. The collar 40 is formed with an extension 41 which functions as a limit stop to be engaged by the abutment flange 19 of the bushing collar 18, the opening 42 within the collar 40 providing sufficient clearance for unrestricted sliding movement of the steering shaft 16 therethrough.

To insure proper alignment of the parts there is mounted axially within the cylinder a rod 45 which is rigidly secured thereto as by a threaded connection 46 with the shaft extension 34. The rod 45 projects into a bore 47 co-axially formed within the steering shaft head 37 and shaft 16 proper, said bore 47 being provided with a longitudinal groove 48 to permit the expulsion of air within said bore into the cylinder 32 as the rod 45 telescopes within said bore. A port or opening 49 is provided in the end wall 33 of the cylinder 32 through which the air therewithin is forced out of as the head 37 is moved downwardly. A similar port may be provided in the collar 40, if so desired, for a like purpose.

It will thus be seen that the steering column construction as above described will permit a downward movement of the steering wheel 20 and column housing 10 away from the body of the driver so that any force applied on such parts will be cushioned and absorbed by the compression of the coil spring 39. Preferably the coil spring 39 is placed under an initial compression to insure the return of the steering column parts to their normal position after the cushioning of any force acting to telescope the same.

Having thus described my invention, I claim as new and desire to secure by Leters Patent:

1. A shock absorbing steering column for a vehicle connected to a steering gear mechanism comprising a steering column housing, a steering shaft rotatably mounted therein, means supporting said column housing for axial non-rotative movement, and a rectilinear shock absorber axially interposed between the lower end of said steering shaft and said steering gear mechanism operative to cushion downward movement of said column housing and shaft upon application of a force thereon, and to transmit the torque from the steering shaft to said steering gear mechanism, said supporting means comprising a supporting bracket at each end of the steering column housing attached to a part of the vehicle each including an anti-friction bearing, and a guide bracket attached to a like part of said vehicle coacting with guide means on said column housing to prevent rotative movement of said column housing.

2. A shock absorbing steering column for a vehicle connected to a steering gear mechanism comprising a steering column housing, a steering shaft rotatably mounted therein, means supporting said column housing for axial non-rotative movement, and a rectilinear shock absorber axially interposed between the lower end of said steering shaft and said steering gear mechanism operative to cushion downward movement of said column housing and shaft upon application of a force thereon, and to transmit the torque from the steering shaft to said steering gear mechanism, said shock absorber comprising a cylinder closed at its lower end, a shaft extension rigid with said cylinder connecting the same to said steering gear mechanism, spline grooves within said cylinder, a splined head rigid with the lower end of the steering shaft coacting with the cylinder spline grooves for axial movement within said cylinder, spring means between said head and the closed end of said cylinder, a rod axially mounted on the closed end of said cylinder, an axial bore in said head and steering shaft for receiving said rod in sliding relation, means in said bore permitting the escape of air therefrom, means in said cylinder permitting the escape of air therein, and a removable annular cap mounted within the upper end of said cylinder having sliding engagement with said steering shaft.

EMORY OWEN BURRELL.